US008332395B2

(12) United States Patent
J. et al.

(10) Patent No.: US 8,332,395 B2
(45) Date of Patent: Dec. 11, 2012

(54) GRAPHICALLY SEARCHING AND DISPLAYING DATA

(75) Inventors: Boss Gregory J., Saginaw, MI (US);
Michele P. Brignull, Essex Junction, VT (US); Rick A. Hamilton, II, Charlottesville, VA (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 12/712,908

(22) Filed: Feb. 25, 2010

(65) Prior Publication Data
US 2011/0208733 A1 Aug. 25, 2011

(51) Int. Cl.
*G06F 17/30* (2006.01)
(52) U.S. Cl. ........ 707/723; 707/769; 707/797; 707/917; 707/956; 707/E17.082; 707/E17.014; 715/730
(58) Field of Classification Search .................. 707/728, 707/723, 722, 769, 797, 917, 956, 999.003; 704/9, 10; 715/730, 732
See application file for complete search history.

(56) References Cited

U.S. PATENT DOCUMENTS

| | | | |
|---|---|---|---|
| 6,904,598 B2 | 6/2005 | Abileah et al. | |
| 8,005,723 B1 * | 8/2011 | Sirota et al. | 705/26.1 |
| 8,090,625 B2 * | 1/2012 | Yi | 705/26.7 |
| 8,165,985 B2 * | 4/2012 | Stefik | 706/62 |
| 2001/0044837 A1 * | 11/2001 | Talib et al. | 709/219 |
| 2004/0111678 A1 * | 6/2004 | Hara et al. | 715/526 |
| 2005/0114829 A1 | 5/2005 | Robin et al. | |
| 2007/0245035 A1 * | 10/2007 | Attaran Rezaei et al. | 709/238 |
| 2008/0177681 A1 | 7/2008 | Rosario et al. | |
| 2008/0195604 A1 | 8/2008 | Sears | |
| 2008/0288914 A1 | 11/2008 | Schmitter | |
| 2009/0144172 A1 * | 6/2009 | Frederick et al. | 705/26 |
| 2009/0204610 A1 * | 8/2009 | Hellstrom et al. | 707/5 |

FOREIGN PATENT DOCUMENTS

| | | | |
|---|---|---|---|
| WO | WO2006071676 A2 | | 7/2006 |
| WO | WO 2006071876 A2 * | | 7/2006 |
| WO | WO2007081519 A2 | | 7/2007 |

* cited by examiner

*Primary Examiner* — Cheryl Lewis
(74) *Attorney, Agent, or Firm* — William E. Schiesser; Ronald A. D'Alessandro; Keohane & D'Alessandro PLLC

(57) ABSTRACT

Embodiments of the present invention provide a multifaceted tool (e.g., graphical representation/object) for searching and displaying data (e.g., search results). Specifically, aspects of the present invention build on "seed" terms to find and display related words, presenting them in a graduated manner by closeness to the seed. The tool allows a user to select variable weights which indicate the desired degree of closeness to the seed word/idea, or it may be randomly generated. Additionally, this tool may be used to create brainstorm teams with a desired level of variance from a target subject. In a typical embodiment, the a search or seed term and corresponding results are displayed in a hub and spoke-like graphical representation whereby the seed term is positioned in a center window of the graphic, and results are displayed in branches that extend radially from the center. Each branch can correspond to a different information source from which the corresponding results were obtained.

25 Claims, 5 Drawing Sheets

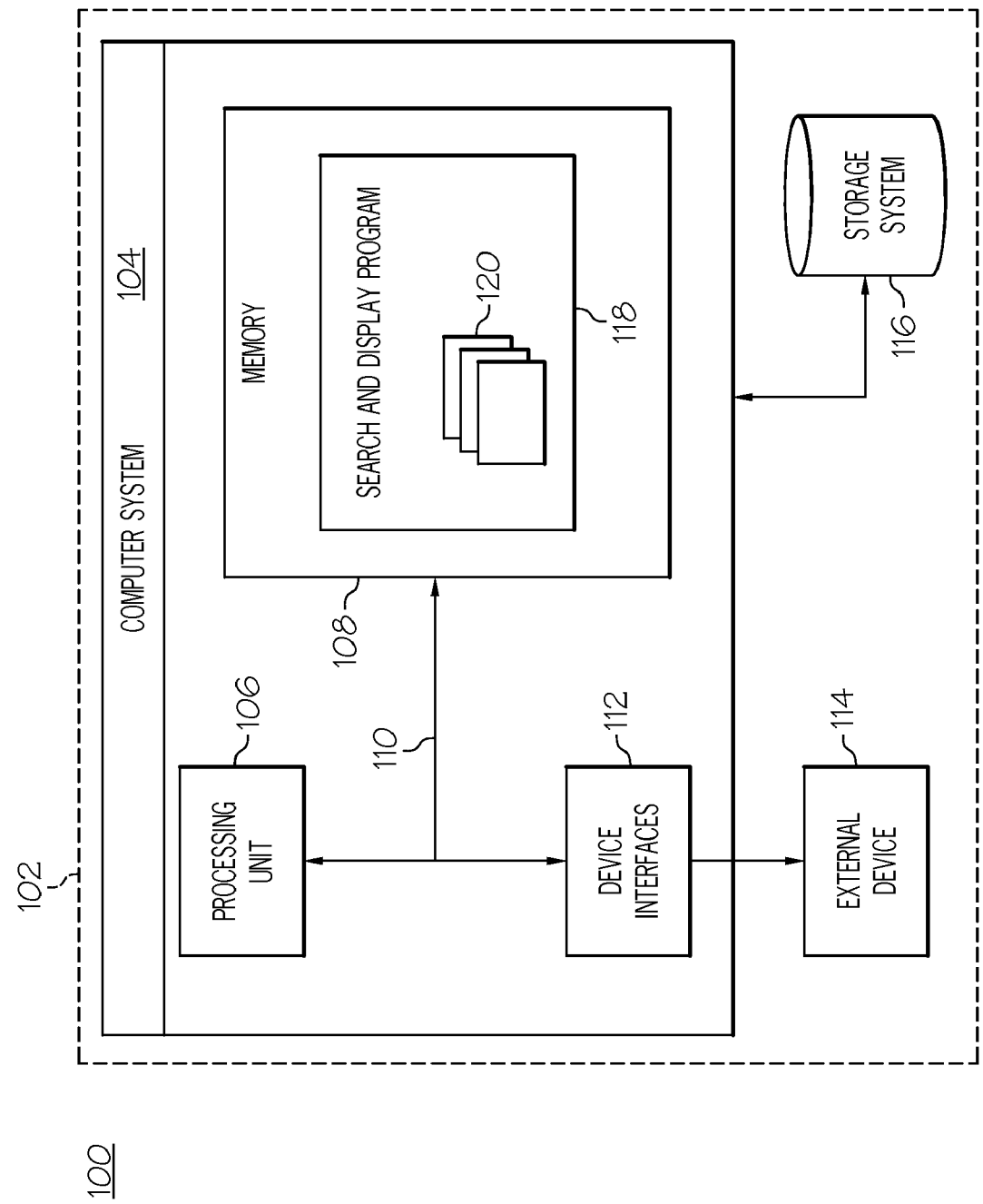

GRAPHICALLY SEARCHING AND DISPLAYING DATA

TECHNICAL FIELD

The present invention generally relates to searching and displaying results. Specifically, the present invention relates to the graphical representation and browsing of search results.

BACKGROUND

Searching is a key aspect of many information-related tasks in work and personal settings. With the advent of the Internet and massive amounts of data being gathered, searching that data has become ever more challenging. Brainstorming is a critical part of business and problem solving. It is used in many applications, including marketing, engineering, inventing, research, problem solving, etc. Many search related activities entail finding something that is well-defined. If one wishes to find information about a new product or service, there are usually enough known elements to uniquely identify the target (product name, product function, company, inventor, audience, etc.). However, there are other types of search activities that do not fall into this scenario where the search target is unknown. A person may, for example, want to explore the latest or lesser known areas of energy exploration, or the latest theories related to a field of science. These types of searches do not have well-defined targets or target words with which to perform the search. One application of this type of searching relates to brainstorming. Brainstorming can be very challenging, as most people's thinking is constrained by their personal experiences or areas of expertise. Participants want to think of concepts that are "out-of-the-box", yet related to the idea at hand. Current methods do not organize related ideas and present them in a way that allows for variation of how "related" the concepts are. When someone is brainstorming, simply thinking of words that are closely related does not always yield the most relevant search terms.

SUMMARY

Embodiments of the present invention provide a multifaceted tool (e.g., graphical representation/object) for searching and displaying data (e.g., search results). Specifically, aspects of the present invention build on "seed" terms to find and display related words, presenting them in a graduated manner by closeness to the seed. The tool allows a user to select variable weights which indicate the desired degree of closeness to the seed word/idea, or it may be randomly generated. Additionally, this tool may be used to create brainstorm teams with a desired level of variance from a target subject. In a typical embodiment, a search or seed term and corresponding results are displayed in a hub and spoke-like graphical representation whereby the seed term is positioned in a center window of the graphic, and results are displayed in branches that extend radially from the center. Each branch can correspond to a different information source from which the corresponding results were obtained.

A first aspect of the present invention provides a method for displaying search results, comprising: performing a search to identify results related to a seed term; displaying the results in a graphical representation, the graphical representation having a set of branches, each of the set of branches corresponding to a particular information source from which the results were obtained; and arranging the results along the set of branches in an order of relevance to the seed term.

A second aspect of the present invention provides a system for displaying search results, comprising: a memory medium comprising instructions; a bus coupled to the memory medium; and a processor coupled to the bus that when executing the instructions causes the system to: perform a search to identify results related to a seed term; display the results in a graphical representation, the graphical representation having a set of branches, each of the set of branches corresponding to a particular information source from which the results were obtained; and arrange the results along the set of branches in an order of relevance to the seed term.

A third aspect of the present invention provides a computer readable medium containing a program product for displaying search results, the computer readable medium comprising program code for causing a computer to: perform a search to identify results related to a seed term; display the results in a graphical representation, the graphical representation having a set of branches, each of the set of branches corresponding to a particular information source from which the results were obtained; and arrange the results along the set of branches in an order of relevance to the seed term.

A fourth aspect of the present invention provides a method for deploying a system for displaying search results, comprising: providing a computer infrastructure being operable to: perform a search to identify results related to a seed term; display the results in a graphical representation, the graphical representation having a set of branches, each of the set of branches corresponding to a particular information source from which the results were obtained; and arrange the results along the set of branches in an order of relevance to the seed term.

A fifth aspect of the present invention provides a graphical representation for displaying search data, comprising: a search term window for displaying a seed term based upon which a search can be conducted; and a set of branches extending radially from the search term window for displaying results of the search; each of the set of branches corresponding to a specific information source from which the results were obtained, the results being arranged on the set of branches so that a result most relevant to the seed term is closest to the seed term in the graphical representation.

BRIEF DESCRIPTION OF THE DRAWINGS

These and other features of this invention will be more readily understood from the following detailed description of the various aspects of the invention taken in conjunction with the accompanying drawings in which:

FIG. 5 shows a more specific computerized implementation according to an embodiment of the present invention.

Figure 1:
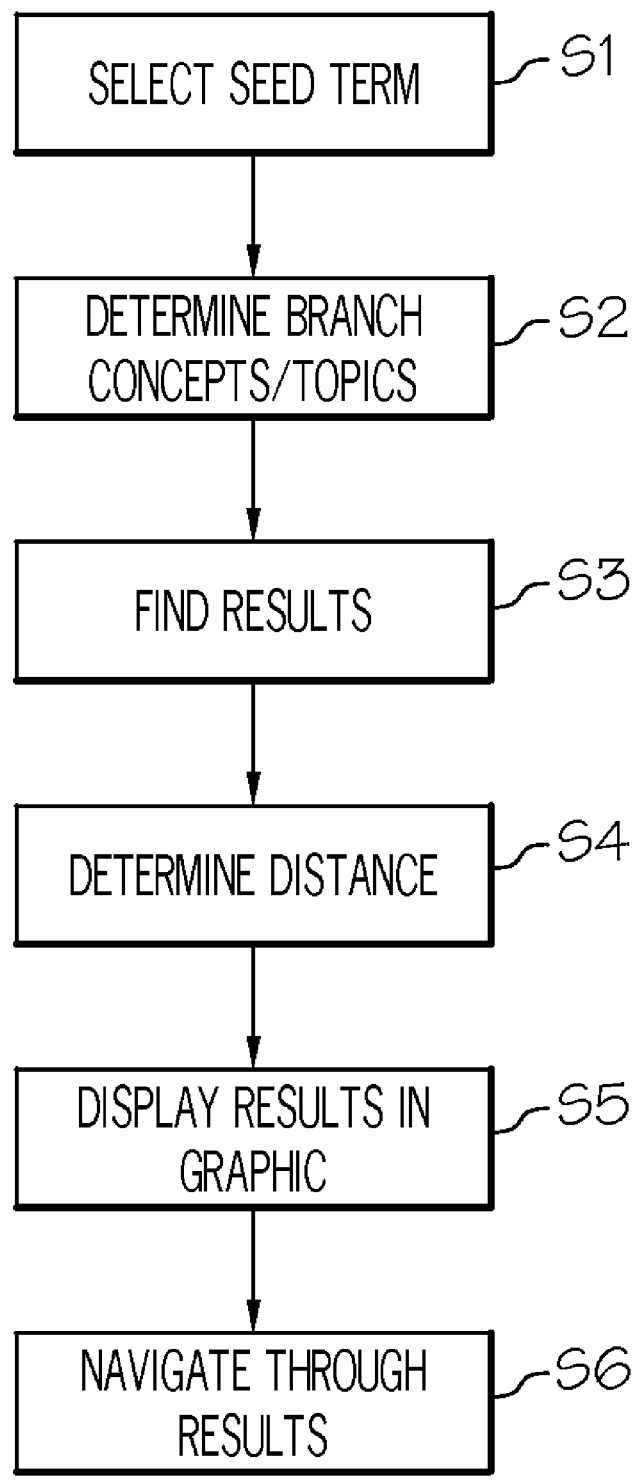
FIG. 1 shows a method flow diagram according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

For convenience, the Detailed Description has the following sections:

I. General Description
II. Computerized Implementation

I. General Description

Embodiments of the present invention provide a multifaceted tool (e.g., graphical representation/object) for searching and displaying data (e.g., search results). Specifically, aspects of the present invention build on "seed" terms to find and display related words, presenting them in a graduated manner by closeness to the seed. The tool allows a user to select variable weights which indicate the desired degree of closeness to the seed word/idea, or it may be randomly generated. Additionally, this tool may be used to create brainstorm teams with a desired level of variance from a target subject. In a typical embodiment, the a search or seed term and corresponding results are displayed in a hub and spoke-like graphical representation whereby the seed term is positioned in a center window of the graphic, and results are displayed in branches that extend radially from the center. Each branch can correspond to a different information source from which the corresponding results were obtained.

More specifically, disclosed is a tool that may be used for searches, brainstorming and/or creative problem solving. It acts as an intelligent pseudo-random word (or idea) generator to expand on target seed terms/words. One aspect of this invention is the graduated scale that drives the selection algorithm to display words, phrases, or topics that are a combination of closely related and far related to the root word. Outputs may be determined based on multiple criteria, such as those described above. The graduated scale enables users to be able to set the level of diversity of thought that will be generated in the brainstorm. The creation and combination of a related or random set of "phrases" may spur creative brainstorming on a specific topic. This helps to avoid the searcher's equivalent of writer's block. To make the output more intelligent, navigable and relevant to the end user, it may also allow for customization of the seed databases. Among other things, this invention can be used by people performing undefined target searches, participating in brainstorming sessions, or during the invention process. It is a tool to help them think of related ideas that may apply to the concept or problem at hand.

Referring now to FIG. 1, a method flow diagram according to the present invention is shown. As depicted in step S1, a seed term/word or phrase is selected or input. In step S2, branch concepts/topics are determined based on the seed term. In step S3, results (e.g., branch words/terms) are found and returned with the distance ranking from the seed term being identified for each result. In step S4, either randomly or by user input, a desired distance ranking from the seed term is determined for each branch word. In step S5, the results are displayed in a graphical representation. In a typical embodiment, the graphical representation has a center window displaying the seed terms with a set (one or more) of branches extending radially therefrom to create a hub and spoke-like appearance. As will be further discussed below, each branch will contain displayed results that are drawn from a particular information source. For example, if four branches are displayed, four information sources were tapped to obtain corresponding results. In addition, in a typical embodiment, the results are displayed in descending order so that the results most relevant to the seed term are positioned closest to the seed term window along the branches. Thus, the closer to the seed term window that a result is positioned, the more relevant that result is to the seed term.

Regardless, in step S6, the results on each branch can be navigated using a graphical object such as a slider that is displayed on each branch. Using a slider or the like allows a user to move closer or further from seed term, displaying results (root words) associated with a selected distance. Although not shown in FIG. 1, a user can select a given result. In response, a separate graphical representation based on the selected result will be displayed (i.e., the selected result will be displayed in the new seed term window of the new graphical representation). This allows for levels of results themselves to be searched and displayed.

As indicated above, results (branch words/terms) are displayed along branches in an order of relevance (e.g., with the most relevant results appearing closest in distance to the seed term in the graphical representation). In accordance with embodiments of the present invention, one or more of the following methods could be implemented: (1) frequency of words use; (2) previously established topics or goals (e.g., set by searcher); and/or (3) historical results based on the seed or similar terms (e.g., determined by examining where the most success occurred in the past, including which concepts/words work best together). In addition to single phrase/word "closeness" to a seed term/phrase, an embodiment of the present invention may also allow the "engine" to steer the output based on one or more of the following criteria or methods:

Time: consider time-related factors such as time of day/year, era, age of requestor, seasonality, etc.

Culture: consider cultural factors such as language, religion, and ethnicity.

Financial: consider factors such as cost, currency, budget, rate of return, etc.

Predefined data bases: select words/phrases from predefined seed databases (the customizable feature mentioned above).

Related categories: for example, if the seed idea was "water conservation", it might pull words/phrases from the "recycling" category or other related topic (this would be a user selected option).

Other industries/domains: select terms from other industries.

Completely random: randomize the selection of words/phrases from all available inputs (e.g., random generators, seed data bases, other algorithms).

Word Dissection: decompose the input word/phrase and use the piece parts to create a new seed idea. For example, if the input idea was "pizza oven", the engine would build two sets of related words: one for "pizza", and one for "oven". The generator might then use a closeness or any other methodology to create new combinations using the two sets, creating things such as "pasta grill" or "bagel toaster" etc.

Search methods: known search methods may be used, including concept or keyword searches.

Language: offer related terms from other languages for multilingual users.

Figure 2:
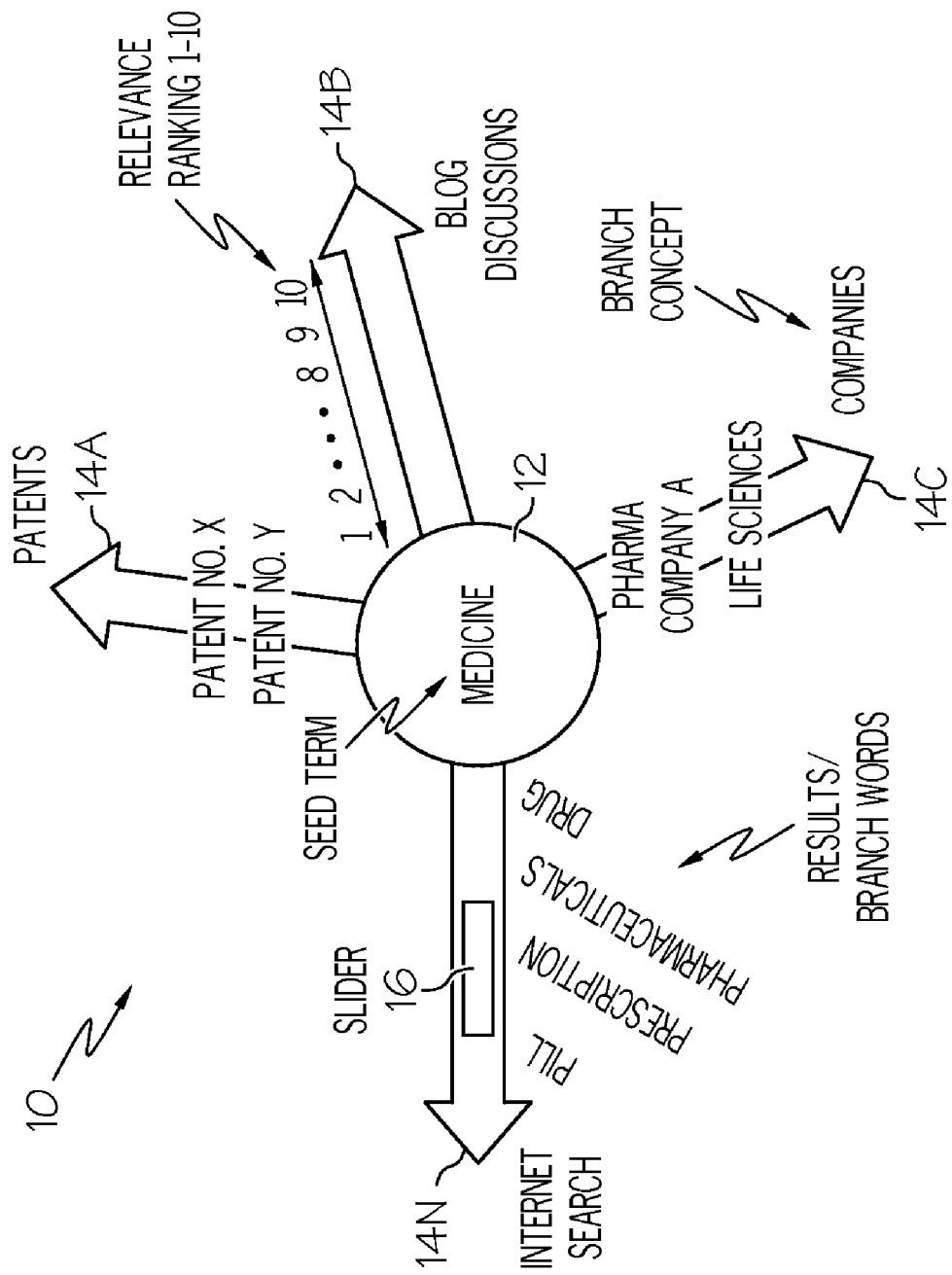
FIG. 2 shows a graphical representation according to an embodiment of the present invention.

Referring now to FIG. 2, an illustrative graphical representation/object (hereinafter graphic 10) is shown. As depicted, graphic 10 includes a seed term (e.g., medicine) positioned in a seed term window, hereinafter window 12. The seed term is the term that is used for a search. Specifically, the present invention can include or work in conjunction with a search engine or the like (e.g., as part of search and display program 118 of FIG. 5). Positioned radially about window 12 are branches 14A-N. Each branch 14A-N corresponds to a particular information source that was searched using the seed term. For example, branch 14A corresponds to patent database, branch 14B corresponds to blog discussions, branch 14C corresponds to companies, while branch 14N corresponds to Internet sources. It should be understood that branches 14A-N shown are only intended to be illustrative and that the present invention could accommodate any quantity of information sources and/or branches.

In any event, results (e.g., specific patents, blogs, company listings, Internet search results, etc.) will typically be arranged along the corresponding branches in an order of relevance (e.g., with the most relevant result being closest to window 12 and/or seed term. In addition, each branch 14A-N can include a graphical object such as a slider 16 or the like that allows navigation of the results on each branch 14A-N. Specifically, when a brainstorming session starts, generally a problem statement is given, which includes one or more keywords to define the subject area. The one or more keywords would be set as the seed term(s) (example: medicine).

Branch concepts are selected along which related words or phrases (results or branch words) will be placed. The closer the branch word is a match to the seed term, the closer in that it will be displayed along the axis of the branch concept (e.g., the term "drug" on branch 14N). Conversely, branch words that are not closely related to the seed term will be placed farther away (e.g., the term "pill" on branch 14N. The user may want to see branch words that are closely related, in which case the closest ones are displayed.

If the user wants to see words that are less closely related to the seed term, he would move slider 16 along the applicable branch 14A-N to see words not as related. The distance of relation may be randomly generated to increase the randomness that sometimes sparks creative solutions. As further shown, results related to the seed term are found and those ranked from 1-10 in "relatedness" are stored. Words ranked 1 are highly related and those ranked 10 are least related. For each branch 14A-N, a random number is generated between 1 and 10. The results that match the "relatedness" corresponding to the random number for that branch 14 A-N will be displayed. For example, in Companies branch 14C, the random number is 3, so words ranking 3 in relatedness are shown. When multiple seed terms are used, results displayed are based on how close they are to all seed terms.

If a link to more information is available from a result, that link may be followed by allowing the user to click on it. For example, the word "medicine" may link to an online dictionary entry for the word. An occurrence of a word in a blog discussion may link to the actual blog entry. Search engines and other data mining tools can associate words based on concept matches. They can also assign a ranking to show how closely two words are associated. Moreover, they can determine how often words are searched for or used on the web (think larger text for more used). Other indicators may be used on the results to emphasize desired traits. For example, results that are found most often during Internet searches may be shown in a larger font. Results that are nouns are displayed in blue, verbs in red, etc. Still yet, embodiments of the present invention may specify different types of words to be found (nouns, verbs, proper nouns, places, things, products, companies, opposites, etc.). The display of results may either include all branch words or a subset, based on selected relatedness. For example, only show the five words in the range of relatedness selected by slider 16. Branches 14A-N may also be extendable to allow for the display of a variable level of relatedness.

Under an embodiment of the present invention, a user may define desired branch concepts, or they may be automatically selected. branch concepts may be industries, patents, blog discussions, search results, companies, etc. Also, branch concepts could also be different word types, for example, have one branch be nouns, one be verbs, etc.

Figure 3:
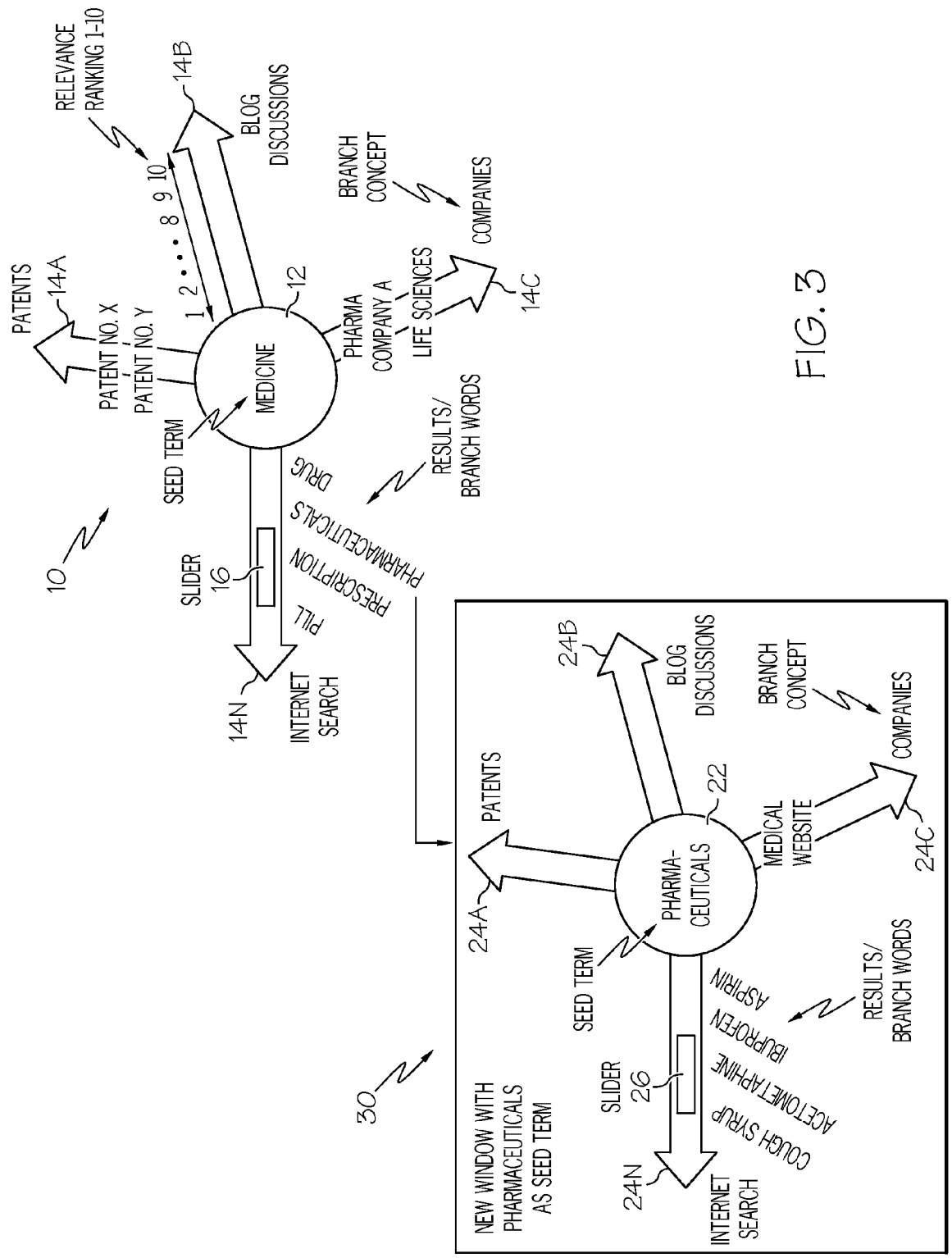
FIG. 3 shows a graphical representation according to another embodiment of the present invention.
Figure 4:
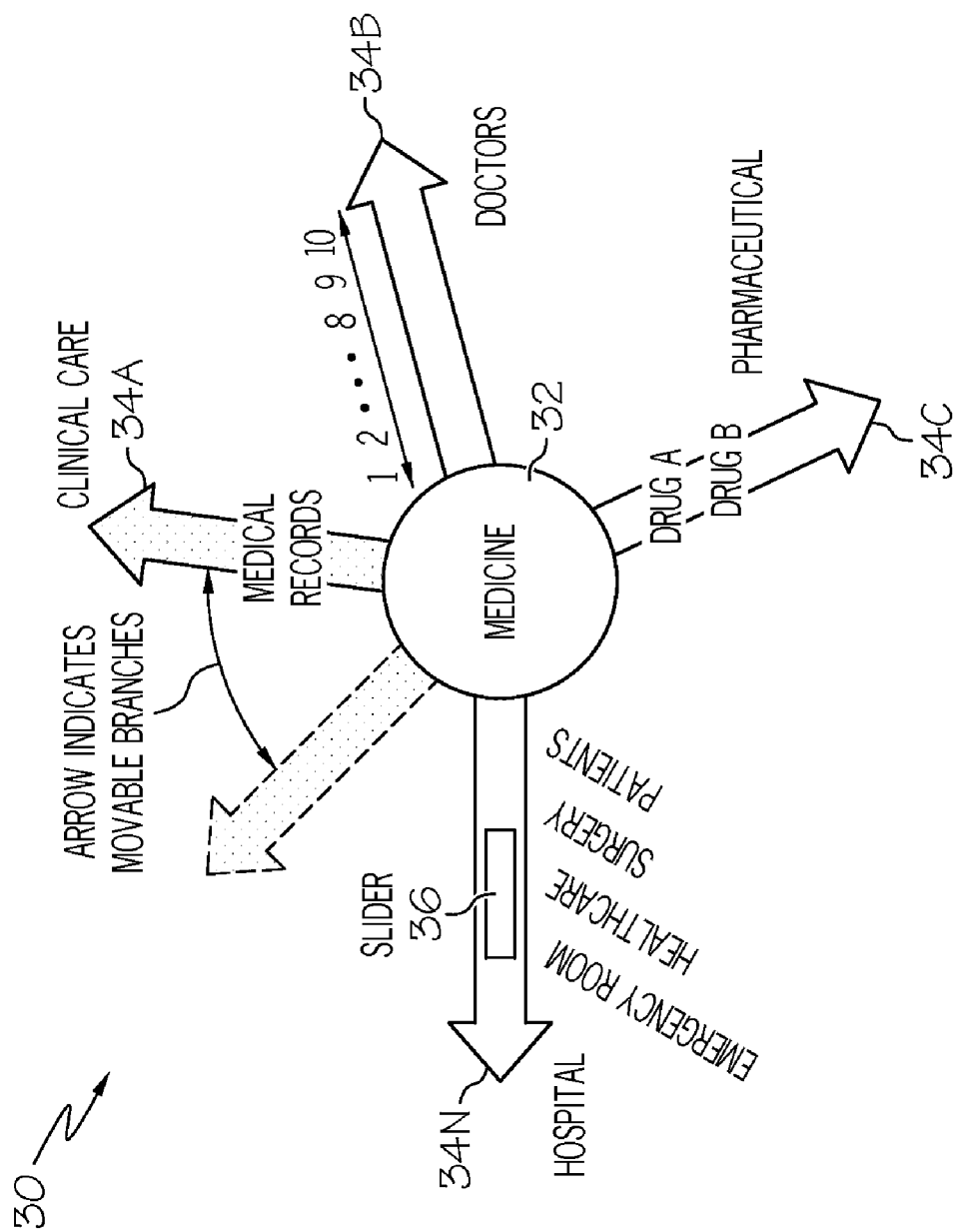
FIG. 4 shows a graphical representation according to another embodiment of the present invention.

Although FIGS. 2-4 show data in a hub and spoke manner, with the seed term as the hub (in seed term window 12), the data could also be stored, displayed and traversed in a tree format, with the seed term as the root of the tree. Regardless of the format of graphic 10, users may vote on how useful a result is, which would cause a recording of the match level vs. usefulness. The system may then learn if there is an optimal distance for creative ideas, or optimal combination of different distances. Users may provide feedback to the system about how useful a suggested word is by subjective rating of the results. Following the ideas through brainstorming to full development (e.g. invention submission) allows learning which words or concepts work best together. This learning may be fed back to improve the use of this disclosed tool. It may learn and modify the output based on prior results for particular users or given topics. Example learning may include:

Optimal relatedness distance

Optimal Branch Concepts to use together

Particular branch concepts that work well with given seed terms

Branch Words that work well together

Often the best brainstorming teams are made up of people with different skills and ideas. One or more embodiments of this invention may also be used to create a team with a given amount of variance of thought and experiences. Variance of thought is determined by having people from different backgrounds, domains, amount of education, job types, etc. For example:

1. Set seed term and branch concepts to topics that relate to areas of interest for desired idea.
2. Using slider, set a desired level of relatedness for each branch to determine a level of variance of thought desired.
3. Once branch concepts and relatedness levels are set, returned keywords are recorded.
4. Employee database is queried for employees with those experiences or skills related to keywords.
5. Display the team that was created.
6. If team is not satisfactory, continue to move slider to change level of relatedness, change branch concepts or move branch concept arms closer or further from each other until a satisfactory team is created.

Referring now to FIG. 3, an additional feature provided by an embodiment of the present invention will be explained. Specifically, if a user was to select a specific result along branches 14A-N, a new graphical representation 20 would be generated based on that selected term. For example, as shown, a user has selected the result "pharmaceuticals". Specifically, the selection of a result in graphic 10 will cause a new search to be conducted based on the selected word. The selected word will thus serve as a new seed term, the searching of which should have results that are displayed in a new graphical representation (new graphic 20). In general, new graphic 20 will have the same functions, features, and characteristics as graphic 10. The only thing that will change is the content displayed thereon (e.g., the new seed term and its corresponding search results). In a new graphic, seed term window 22 contains the new seed term. Branches 24A-N each correspond to a particular information source/topic and (similar to graphic 10) contain results in an order of relatedness. A slider 26 can be used to navigate about new graphic 10.

Referring now to FIG. 4, another embodiment of the present invention is shown. Specifically, FIG. 4 shows that branches 34A-N may be moveable to generate words related to both categories. In this example, by moving "clinical care" branch 34A closer to "hospital" branch 34N, ideas may be generated that relate to both topics. This causes a weighting to be assigned to different terms to determine if results should include multiple inputs. This movement or linking of branches allows a further level of searching to be conducted within a common graphic 30.

It should be understood that various other graphical manipulations can be made for the graphics of FIGS. 2-4. For example, the graphics can be rotated; certain locations of the graphics can be zoomed in on or zoomed out; etc.

II. Computerized Implementation

Referring now to FIG. 5, a computerized implementation 100 of the present invention is shown. As depicted, implementation 100 includes a computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

As shown, computer system 104 includes a processing unit 106, a memory 108, a bus 110, and a device interfaces 112. Further, computer system 104 is shown having external devices 114 and storage system 116 that communicate with bus 110 via device interfaces 112. In general, processing unit 106 executes computer program code, such as search and display software/program 118, which is stored in memory 108 and/or storage system 116. While executing computer program code, processing unit 106 can read and/or write data to/from memory 108, storage system 116, and/or device interfaces 112. Bus 110 provides a communication link between each of the components in computer system 104. Although not shown, computer system 104 could also include I/O interfaces that communicate with: one or more external devices such as: a keyboard, a pointing device, a display, etc.; one or more devices that enable a user to interact with computer system 104; and/or any devices (e.g., network card, modem, etc.) that enable computer system 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various processes of the invention. Moreover, computer system 104 is only representative of various possible computer systems that can include numerous combinations of hardware. To this extent, in other embodiments, computer system 104 can comprise any specific purpose-computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations (e.g., on a client and server). Similarly, memory 108 and/or storage system 116 can comprise any combination of various types of data storage and/or transmission media that reside at one or more physical locations. Further, device interfaces 112 can comprise any module for exchanging information with one or more external devices. Still further, it is understood that one or more additional components (e.g., system software, math co-processing unit, etc.) not shown in FIG. 5 can be included in computer system 104.

Storage system 116 can be any type of system capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN), or a storage area network (SAN) (not shown). In addition, although not shown, additional components, such as cache memory, communication systems, system software, etc., may be incorporated into computer system 104.

Shown in memory 108 of computer system 104 is search and display program 118 having a set of modules 120. The modules 120 generally provide the functions of the present invention as described herein. Specifically (among other things), set of modules 120 is configured to: perform a search to identify results related to a seed term; display the results in a graphical representation, the graphical representation having a set of branches, each of the set of branches corresponding to a particular information source from which the results were obtained; arrange the results; link two of the set of branches; display results related to one another from the two branches in response to the linking; receive a selection of one of the results arranged along one of the set of branches; and/or display a new graphical representation based on the selection, the new graphical representation having results related to a search performed based on the selection, the results being arranged along a new set of branches of the new graphical representation.

While shown and described herein as a search and display solution, it is understood that the invention further provides various alternative embodiments. For example, in one embodiment, the invention provides a computer-readable/useable medium that includes computer program code to enable a computer infrastructure to provide a search and display solution. To this extent, the computer-readable/useable medium includes program code that implements each of the various processes of the invention. It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 5) and/or storage system 116 (FIG. 5) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a method that performs the process of the invention on a subscription, advertising, and/or fee basis. That is, a service provider, such as a solution Integrator, could offer to provide a search and display solution. In this case, the service provider can create, maintain, support, etc., a computer infrastructure, such as computer infrastructure 102 (FIG. 5) that performs the process of the invention for one or more customers. In return, the service provider can receive payment from the customer(s) under a subscription and/or fee agreement and/or the service provider can receive payment from the sale of advertising.

In still another embodiment, the invention provides a computer-implemented method for searching and displaying results. In this case, a computer infrastructure, such as computer infrastructure 102 (FIG. 5), can be provided and one or more systems for performing the process of the invention can be obtained (e.g., created, purchased, used, modified, etc.) and deployed to the computer infrastructure. To this extent, the deployment of a system can comprise one or more of: installing program code on a computing device, such as computer system 104 (FIG. 5), from a computer-readable medium; adding one or more computing devices to the computer infrastructure; and incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing and/or device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, etc.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for displaying search results comprising:
performing a search to identify results related to a seed term;
displaying the results in a graphical representation, the graphical representation having a set of branches, each of the set of branches corresponding to a particular information source from which the results were obtained; and
arranging the results along the set of branches in an order of relevance to the seed term.

2. The method of claim 1, further comprising providing a graphical object in the graphical representation to review the results.

3. The method of claim 2, the graphical object comprising a slider disposed along each of the set of branches.

4. The method of claim 1, further comprising displaying the seed term in a center of the graphical representation, each of the set of branches extending from the center.

5. The method of claim 1, the arranging comprising arranging the results so that a result most relevant to the seed term is closest to the seeds term in the graphical representation.

6. The method of claim 1, further comprising:
linking a two of the set of branches; and
displaying results related to one another from the two branches in response to the linking.

7. The method of claim 1, further comprising:
receiving a selection of one of the results arranged along one of the set of branches; and
displaying a new graphical representation based on the selection, the new graphical representation having results related to a search performed based on the selection, the results being arranged along a new set of branches of the new graphical representation.

8. A system for displaying search results comprising:
a memory medium comprising instructions;
a bus coupled to the memory medium; and
a processor coupled to the bus that when executing the instructions causes the system to:
perform a search to identify results related to a seed term;
display the results in a graphical representation, the graphical representation having a set of branches, each of the set of branches corresponding to a particular information source from which the results were obtained; and
arrange the results along the set of branches in an order of relevance to the seed term.

9. The system of claim 8, the system further being caused to provide a graphical object in the graphical representation to review the results.

10. The system of claim 9, the graphical object comprising a slider disposed along each of the set of branches.

11. The system of claim 8, the system further being caused to display the seed term in a center of the graphical representation, each of the set of branches extending from the center.

12. The system of claim 8, the system further being caused to arrange the results so that a result most relevant to the seed term is closest to the seeds term in the graphical representation.

13. The system of claim 8, the system further being caused to:
link a two of the set of branches; and
display results related to one another from the two branches in response to the linking.

14. The system of claim 8, the system further being caused to:
receive a selection of one of the results arranged along one of the set of branches; and
display a new graphical representation based on the selection, the new graphical representation having results related to a search performed based on the selection, the results being arranged along a new set of branches of the new graphical representation.

15. A computer readable storage medium containing a program product for displaying search results, the computer readable storage medium comprising program code for causing a computer to:
- perform a search to identify results related to a seed term;
- display the results in a graphical representation, the graphical representation having a set of branches, each of the set of branches corresponding to a particular information source from which the results were obtained; and
- arrange the results along the set of branches in an order of relevance to the seed term.

16. The computer readable storage medium containing the program product of claim 15, the computer readable storage medium further comprising program code for causing the computer to provide a graphical object in the graphical representation to review the results.

17. The computer readable storage medium containing the program product of claim 16, the graphical object comprising a slider disposed along each of the set of branches.

18. The computer readable storage medium containing the program product of claim 15, the computer readable storage medium further comprising program code for causing the computer to display the seed term in a center of the graphical representation, each of the set of branches extending from the center.

19. The computer readable storage medium containing the program product of claim 15, the computer readable storage medium further comprising program code for causing the computer to arrange the results so that a result most relevant to the seed term is closest to the seeds term in the graphical representation.

20. The computer readable storage medium containing the program product of claim 15 the computer readable storage medium further comprising program code for causing the computer to:
- link a two of the set of branches; and
- display results related to one another from the two branches in response to the linking.

21. The computer readable storage medium containing the program product of claim 15, the computer readable storage medium further comprising program code for causing the computer to:
- receive a selection of one of the results arranged along one of the set of branches; and
- display a new graphical representation based on the selection, the new graphical representation having results related to a search performed based on the selection, the results being arranged along a new set of branches of the new graphical representation.

22. A method for deploying a system for displaying search results, comprising:
deploying a computer infrastructure being operable to:
- perform a search to identify results related to a seed term;
- display the results in a graphical representation, the graphical representation having a set of branches, each of the set of branches corresponding to a particular information source from which the results were obtained; and
- arrange the results along the set of branches in an order of relevance to the seed term.

23. A graphical representation for displaying search data, comprising:
- a search term window for displaying a seed term based upon which a search can be conducted; and
- a set of branches extending radially from the search term window for displaying results of the search; each of the set of branches corresponding to a specific information source from which the results were obtained, the results being arranged on the set of branches so that a result most relevant to the seed term is closest to the seed term in the graphical representation.

24. The graphical representation of claim 23, the set of branches comprising a graphical object for navigating through the results as arranged on the set of branches.

25. The graphical representation of claim 24, the graphical object comprising a slider.

* * * * *